Oct. 25, 1966

M. LEICHSENRING 3,281,786

VEHICLE SIGNALLING SYSTEM

Filed Jan. 12, 1966

Inventor:-
Max Leichsenring,
By Cannon, Jackson, Boettcher & Dunn
Attys.

Oct. 25, 1966 — M. LEICHSENRING — 3,281,786
VEHICLE SIGNALLING SYSTEM
Filed Jan. 12, 1966 — 2 Sheets-Sheet 2
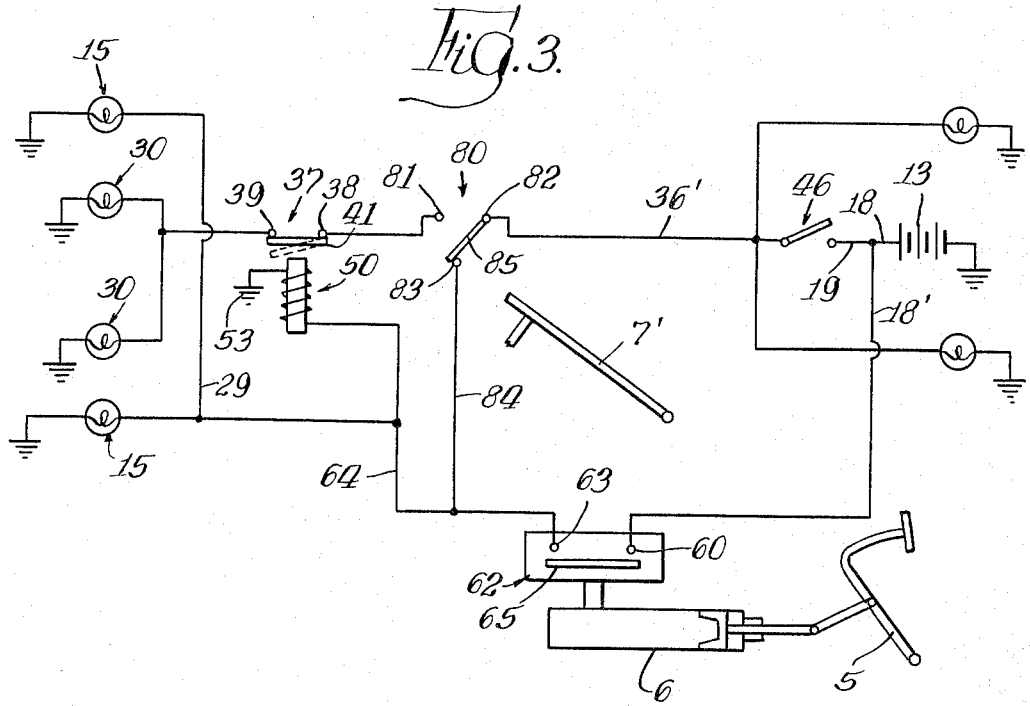
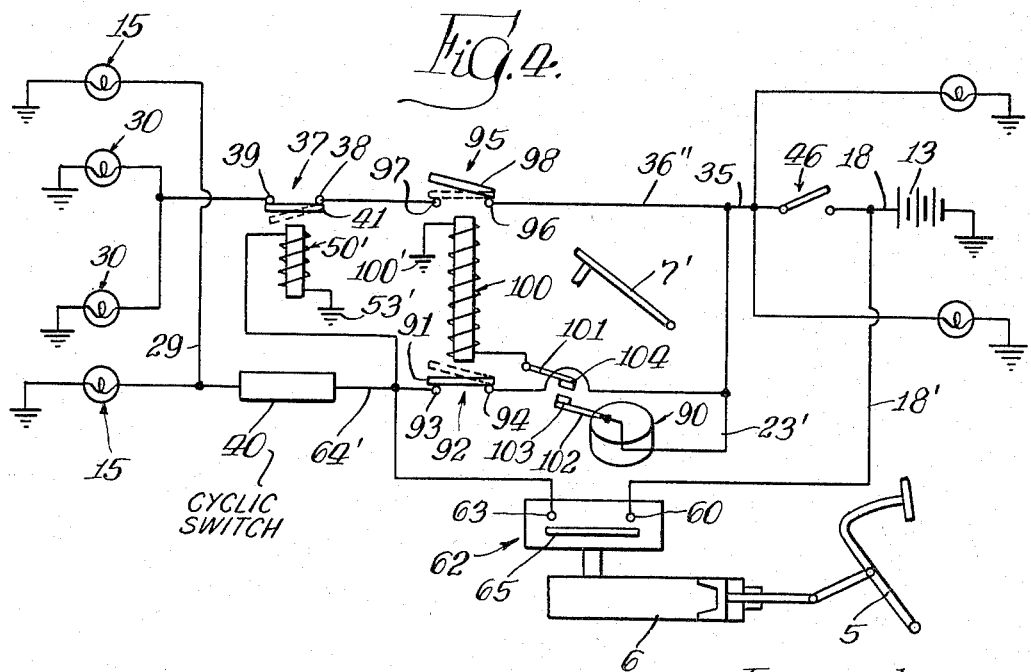
Inventor:—
Max Leichsenring,
By Brown, Jackson, Boettcher & Dienner
Attys.

United States Patent Office 3,281,786
Patented Oct. 25, 1966

3,281,786
VEHICLE SIGNALLING SYSTEM
Max Leichsenring, 4525 N. Francisco St., Chicago, Ill.
Filed Jan. 12, 1966, Ser. No. 520,182
9 Claims. (Cl. 340—66)

The present invention relates to an improvement in signalling systems for automotive vehicles.

It is the object of the present invention to provide a pair of different signalling means for positioning at the rear of an automotive vehicle, and which signalling means are adapted to be selectively actuated so that a trailing motorist will know whether (1) the leading vehicle is stopped, being braked, or moving below a predetermined forward speed, or (2) the leading vehicle is moving at or above such predetermined forward speed.

Preferred embodiments of the invention will be described in conjunction with the accompanying drawings in which.

FIGURE 3 is a diagrammatic illustration of still another embodiment of the invention associated with brake means, and a second form of motion control means responsive to forward speed of the vehicle and which motion control means may embody snap or toggle switch means; and FIGURE 4 is a diagrammatic illustration of still another embodiment of the invention associated with brake means, and a third form of motion control means responsive to forward speed of the vehicle.

Figure 1:
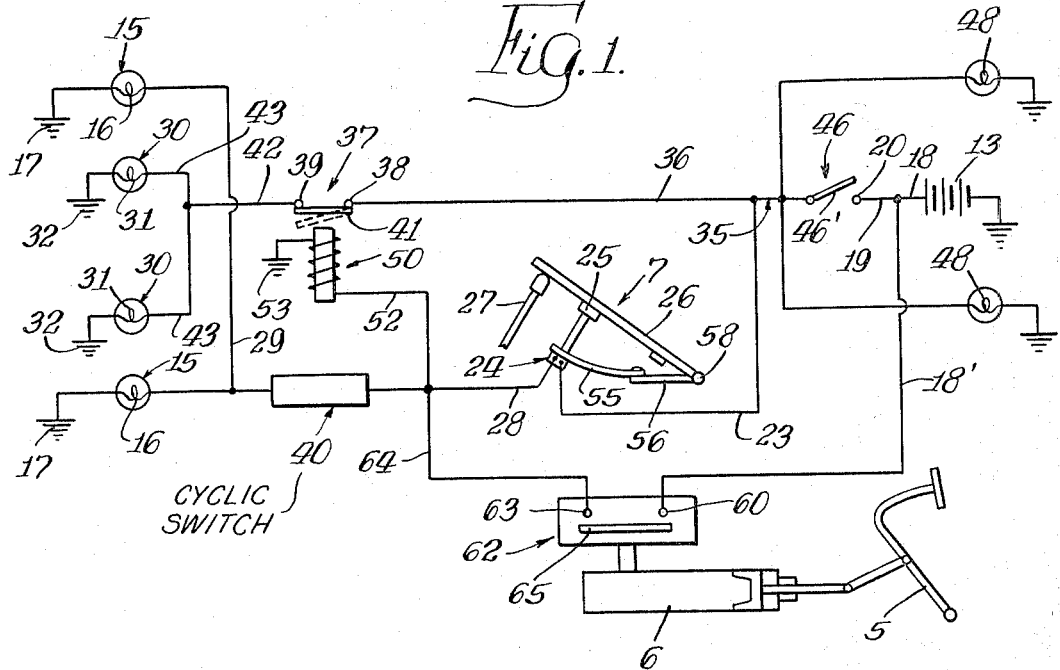
FIGURE 1 is a diagrammatic illustration of one embodiment of the invention associated with brake means, and motion control means in the form of accelerator means for a vehicle.

Referring now to FIGURE 1 of the drawings, there is shown one embodiment of my invention for incorporation in a conventional engine powered automotive vehicle equipped with brakes. According to conventional practice, a brake pedal 5 through a master fluid cylinder 6 provides for application of the vehicle brakes (not shown) and motion control means, indicated at 7, in the form of accelerator means hereinafter described provides for controlling the speed of the engine of the vehicle. As will appear, the accelerator means 7 may be constructed in accordance with the principles of my prior Patent No. 3,171,917 dated March 2, 1965 modified, however, in the respects hereinafter noted.

As shown in FIGURE 1, first circuit means extends from a source of electrical potential 13, such as a conventional storage battery, to first electrically energizable signal means, such as a pair of stop lights as indicated at 15, and which may comprise brake signals embodying electrically energizable filaments 16 connected to ground as at 17. The stop lights when energized may display the conventional red colored signal. First circuit means for the first electrically energizable signal means comprises a lead 18 extending from one terminal of the storage battery 13 to a branch lead 19 connected with one terminal 20 of a light switch 46. The light switch comprises a switch blade 46' to lead 35 from which lead 23 extends to one contact of a first control switch means 24 located at the lower end of a bracket 25 secured to the pedal member 26 which serving as an accelerator pedal for the engine of the vehicle. A rod 27 connected to the outer end of pedal 26 connects with conventional linkage leading to the carburetor for the engine of the vehicle. In the normal released position of the accelerator pedal the engine is at idle and depression of the pedal increases the speed of the engine. A lead 28 extends from the other contact of switch means 24 to one of the filaments 16 of one of the stop signals 15 with a branch lead 29 extending to the other filament 16 of the other stop light signal 15. If desired, known cyclic switch means 40 may be incorporated in the lead 28 to provide steady or intermittent energization or combinations of steady and intermittent energization of the filaments 16 of the first signal means defined by the stop lights 15 through the first circuit means described.

Second circuit means in the arrangement of FIGURE 1 is provided for energizing second electrically energizable signal means, such as a pair of lights 30 including energizable filaments 31 connected to ground as at 32. The second electrically energizable means 30 may comprise running or tail lights and may, for example, be green in color as distinguished from the red stop lights 15. Any desired combinations of colored lights for the first and second energizable signal means, as shown at 15 and 30, may be selected to provide understandable and distinguishable signals to a motorist trailing the vehicle in which the system is embodied as will be hereinafter discussed. The second circuit means provides for connecting in parallel relation with the aforedescribed first signal means 15 and the second signal means 30 and for this purpose may include a lead 36 extending from the junction of leads 35 and 23, and which lead 36 has connection with a normally closed switch, indicated at 37, including a pair of contacts 38 and 39 which are normally closed by switch blade 41. A lead 42 extends from the normally closed switch 37 to branch leads 43 extending one each to the filaments 31 of the second signal means afforded by signal lights 30. When the switch 46 is closed and the brake pedal 5 and accelerator pedal 26 are in their normal positions, head lights, such as shown at 48, and the first signal means or stop lights 15 are energized through the circuitry above described.

A solenoid coil indicated at 50 is connected in the above described first circuit means through lead 52 extending from lead 28 and with the other end of the coil being grounded as at 53.

In the circuit means as above described and with the accelerator pedal 26 of the motion control means 7 in its retracted or engine idle position provides through a leaf spring member 55 carried by a movable member 56 pivoted as at 58 to the lower end of the accelerator pedal 26 for closing the first control switch means 24, closing a circuit to the first electrically energizable signal means defined by the stop lights 15. Also, the solenoid 50 is energized through lead 52 and ground 53 opening normally closed switch 37 to effect de-energization of the second electrically energizable signal means defined by the running or tail lights 30.

In operation of the vehicle and upon depressing accelerator pedal 26 the flexible member 55 of the actuator 56 follows the descending first control switch 24 to retain such switch means closed continuing to effect energization of the first electrically energizable signal means 15. Upon positioning of the accelerator pedal member 26 of the motion control means 7 to a predetermined position for a predetermined selected forward speed as may be desired, say of the order of 10 to 15 m.p.h., the first control switch means 24 opens, opening the circuit to the first signal means afforded by the stop lights 15. Opening of first control switch means 24 is effected by advancing the switch away from the maximum flexed position of leaf spring member 55. The feature of providing for opening and closing of switch means 24 over a change of vehicle speed of a predetermined range may be achieved by providing accelerator means of the construction of my aforementioned patent, the disclosure of which is incorporated by reference herein. Opening of the first control switch means 24 effects de-energization of the solenoid 50 permitting normally closed switch means 37 to close and thus effect energization of the second signal means 30. In the arrangement described, the stop light signals 15 may give a red warning signal and the running or tail lights 30 may be provided to give a green running signal so that a trailing motorist will know that when the leading vehicle is travelling below the predetermined selected speed the first signal or stop light filaments will be energized, but upon the vehicle attaining a speed at or above the predetermined selected speed the first signal means will be de-energized and the running or tail signal means energized indicating that the vehicle is travelling at or above a predetermined selected speed.

In lieu of the movable member 56 and leaf spring member 55 a vehicle speed responsive switch may be substituted for switch means 24 for opening and closing the circuits above described to provide the aforementioned signals to a trailing motorist.

According to the invention, it is also proposed to incorporate circuit means associated with the afore-described brake means in which a lead 18' extends to a first contact 60 of second control switch means 62 which embodies a second contact 63 having connection with a branch lead 64 extending to lead 28 of the first circuit means. The second control switch means 62 embodies a switch blade 65 which is adapted to be moved to a position connecting contacts 60 and 63 upon application of the brake pedal. Thus, in the afore-described arrangement, application of the brake pedal closes a circuit between the source of potential 13 and the first signal means provided by stop lights 15, and energization of which circuit energizes the solenoid 50 to open the circuit means for the running or tail lights. Thus, in the arrangement of FIGURE 1, the application of the brake 5 for slowing the vehicle effects energization of the first signal means indicating to a trailing motorist that the vehicle is being braked.

Figure 2:
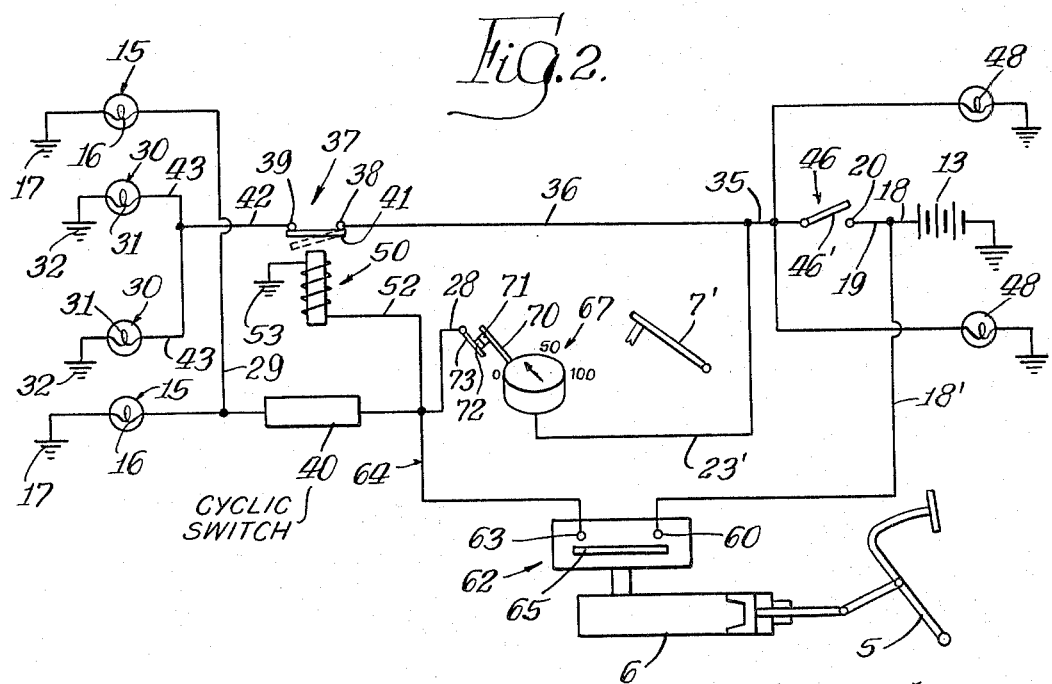
FIGURE 2 is a diagrammatic illustration of another embodiment of the invention associated with brake means, and one form of motion control means operable responsive to forward speed of the vehicle.

Referring now to FIGURE 2, there is shown another embodiment of the invention embodying motion control means 67 responsive to forward speed of the vehicle together with accelerator control means of my above referred to patent. The other components of the arrangement in common with those described in connection with FIGURE 1 bear like reference numerals. In the arrangement of FIGURE 2, the motion control means 67 may comprise any known speedometer switch means driven in response to the speed of the vehicle and connected in circuit between leads 23' and 28. As diagrammatically shown in the drawing the speedometer switch means comprises a switch blade 70 provided with a first switch contact 71 which is adapted to be engaged and disengaged with respect to a second switch contact 72 electrically connected to the lead 28 through contact blade or conductor 73. In the arrangement shown, upon movement of the switch arm 70 to a position at a desired selected predetermined forward speed of the vehicle to which the speedometer 67 is set effects closing of the circuit means for the first signal means 15 and opening normally closed switch means 37 to de-energize the second signal means 30. The accelerator control means 7' may be a conventional accelerator pedal but if desired may be like that of my above referred to patent so that the first signal means or stop lights 15 are energized and the second signal means or running lights 30 de-energized upon reduction of driving power of the engine of the vehicle of a given predetermined amount less than and over the full range of the driving power of the vehicle. The components of FIGURE 2 otherwise function in the same way as above described in connection with FIGURE 1.

Referring now to FIGURE 3 the embodiment of my invention therein shown embodies motion control means 80 responsive to forward speed of the vehicle in a manner to be described. In this form of the invention, the ac- celerator pedal 7' again may be a conventional form of accelerator pedal not connected in the circuitry or may be like that of my aforementioned patent. All other components of the arrangement are the same as described in connection with FIGURE 1 and like reference numerals have been applied to the parts common to FIGURE 1 and FIGURE 3. In the arrangement of FIGURE 3, the motion control means 80 may typically comprise a governor snap or toggle type control switch means embodying a pair of contacts 81 and 82 connected in the line or lead 36' of circuit means for the second or running signal means 30. The motion control device 80 further comprises a third contact 83 connected by a lead 84 to the lead 64 extending from the terminal 63 of stop switch means 62. The motion control means 80 further comprises a switch blade 85 connected at one end to the contact 82 and movable in circuit making and breaking relation with respect to contacts 81 and 83. The switch blade 85 may be moved into engaging and disengaging positions with respect to the contacts 81 and 83 in response to a governor responsive to the forward speed of the vehicle. Governor control switch means 80 are well known in the art and any known device having the components as above described is suitable for practicing the present invention. The motion control switch means 80 may be preset to a selected predetermined speed so that when the predetermined speed is reached, the switch blade 85 is moved by snap action to disengage contacts 83 and snap engage contact 81. Thus, at such selected predetermined speed the circuit for the first signal means or stop signals 15 is disengaged as above described to effect de-energization of solenoid 50 and closing of the normally closed switch 37 and thus effect energization of the running or tail signal means 30. When the vehicle drops below the predetermined selected speed for which the motion control switch means 80 has been set, switch blade 85 is again snap actuated to disengage it from contact 81 and again engage contact 83, and under this condition the first signal means or stop signals 15 are energized and the second signal means or running or tail lights 30 are de-energized. Actuation of the brake means 5 functions in the arrangement of parts as described in connection with FIGURE 1.

Upon reference now to FIGURE 4, there is shown another embodiment of the present invention and with the components of this embodiment of the invention common with components described in connection with the foregoing embodiments bearing the same reference numerals. In this form of the invention, the accelerator pedal 7' for controlling the speed of the vehicle need not be functionally related to the arrangement except for controlling the speed of the vehicle, but if desired it could be of the construction of my above referred to patent. In this form of the invention motion control means 90 is provided and is in the form of speedometer switch means responsive to the forward speed of the vehicle. As shown, normally closed third control switch means 92 is embodied in the lead 64' and comprises contacts 93 and 94 which are adapted to be opened and closed by a movable switch blade 91. A normally open fourth control switch means 95 is connected in the lead 36'' and it comprises contacts 96 and 97 adapted to be opened and closed by switch blade 98. A solenoid 100 is disposed between the switch blades of the third and fourth control switch means 92 and 95. The solenoid is connected to ground as at 100' and with the other end of the coil extending to switch arm 101 of the motion control means 90. The motion control means 90 is of known construction and comprises a switch arm 102 carrying a contact 103 adapted to be engaged and disengaged with contact 104 of member 101. The motion control means 90 may be set to provide for engaging contacts 103 and 104 at a selected predetermined forward speed of the vehicle. In the arrangement of components described, upon engagement of contacts 103 and 104 at the predetermined selected forward speed, the circuit through solenoid 100 is closed effecting opening of normally closed third control switch means 92 and closing of normally open fourth control switch means 55 to effect opening of the circuit to the first signal or stop light means 15, and closing of the circuit means to the second signal means or tail or running lights 30. When the speed of the vehicle drops below the predetermined selected forward speed, the contacts 103 and 104 disengage to establish a circuit for the first signal means or stop lights 15. Under the condition last noted, the solenoid 50' is energized and effects opening of normally closed switch means 37 to de-energize the second signal means or running or tail lights 30. The first signal means or stop lights 15 are also adapted to be energized upon depression of the brake pedal 5, closing brake switch means 62 energizing solenoid 50' which through the circuitry afore-described effects energization of the first signal means or stop lights 15 and de-energization of the second signal means or tail or running lights 30.

While I have described certain preferred embodiments of my invention, it will be understood that various modifications and rearrangements may be made therein without departing from the spirit and scope of the invention.

I claim:

1. For use in an engine powered vehicle having control means including a component movable relative to movement of the vehicle, first and second electrically energizable signal means, a source of electrical potential, brake means applicable for braking the vehicle, the combination comprising first circuit means between said first signal means and said source of potential, first control switch means in said first circuit means, second circuit means connecting said second signal means in parallel relation with said first signal means, second switch means in said second circiut means, said control means providing for opening said first control switch means and closing said second switch means to de-energize said first signal means and energize said second signal means upon predetermined movement in one direction of said component of said control means, and for closing said first control switch means and opening of said second switch means responsive to predetermined movement in the other direction of said component of said control means to energize said first signal means and de-energize said second signal means, and second control switch means in parallel with said first control switch means adapted to be opened and closed by movement of said brake means to provide for opening and closing said second switch means to de-energize and energize said first signal means.

2. The combination of claim 1 in which said control means is defined by accelerator means for controlling the engine of the vehicle.

3. The combination of claim 1 in which said control means is defined by means driven in response to the speed of the vehicle.

4. In the combination of claim 1 the provision of cyclic switch means in said first circuit means to provide for intermittent energization of said first signal means upon closing of said first control switch means.

5. The combination of claim 4 characterized by the provision of cyclic switch means in said first circuit means to provide for intermittent energization of said first signal means upon closing of said first or second control switch means.

6. The combination of claim 2 in which said first control switch means includes means for providing a time delay in opening said first control switch means upon movement of said accelerator means in a power increasing direction.

7. The combination of claim 1 characterized by the provision of normally closed third control switch in series in said first circuit means, a normally open fourth control switch means in said circuit means for said second signal means, and means for opening said third control switch means and closing said fourth control switch means upon closing of said first control switch means.

8. The combination of claim 1 characterized by normally opened and closed control switch means in said circuit means for said first and second signal means, respectively, and means for closing and opening said normally opened and closed switch means, respectively, upon closing of said first control switch means.

9. The combination of claim 8 in which the vehicle has brake means applicable for braking the vehicle the provision of second control switch means in parallel with said first control switch means adapted to be opened and closed by movement of said brake means for closing and opening said normally opened and closed switch means, respectively.

References Cited by the Examiner

UNITED STATES PATENTS

| | | | |
|---|---|---|---|
| 2,096,069 | 10/1937 | Seiden | 340—66 |
| 2,260,680 | 10/1941 | Nelsen | 340—66 |
| 2,275,695 | 3/1942 | Stafford | 340—66 |
| 3,171,917 | 3/1965 | Leichsenring | 200—86.5 |

FOREIGN PATENTS 1,165,760  10/1958  France.

NEIL C. READ, *Primary Examiner.*

A. H. WARING, *Assistant Examiner.*